Oct. 25, 1960     W. TURNWALD     2,957,620

COMPRESSOR HEAD ASSEMBLY

Filed Aug. 19, 1957     2 Sheets-Sheet 1

INVENTOR.
WOLFGANG TURNWALD
BY
PARKER & CARTER
ATTORNEYS

Oct. 25, 1960 W. TURNWALD 2,957,620
COMPRESSOR HEAD ASSEMBLY
Filed Aug. 19, 1957 2 Sheets-Sheet 2
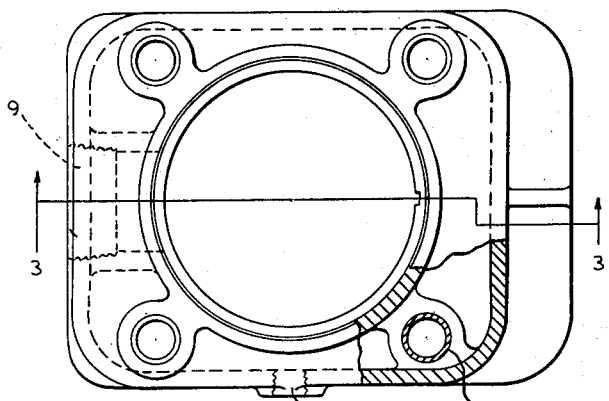
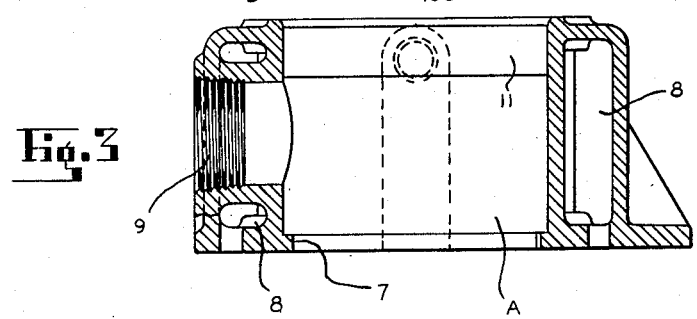
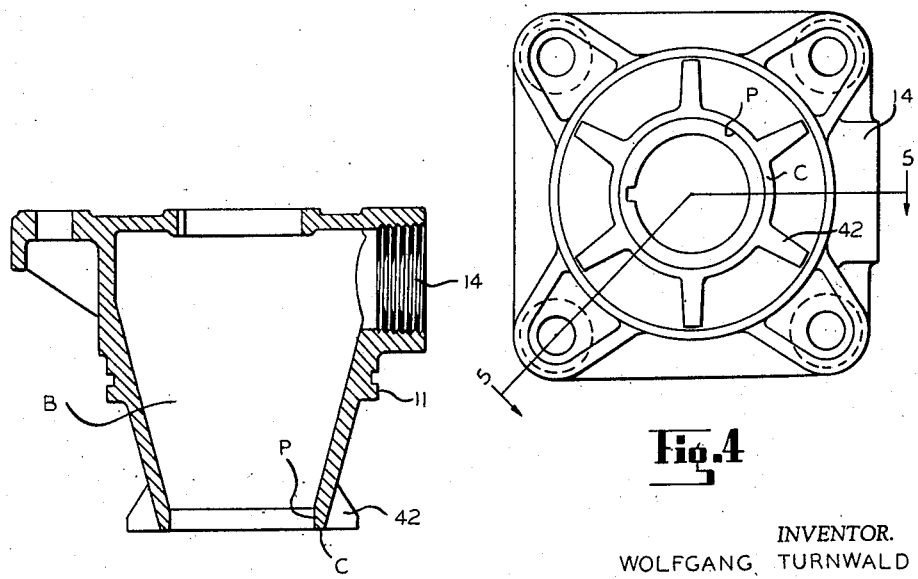
INVENTOR.
WOLFGANG TURNWALD
BY
PARKER & CARTER
ATTORNEYS

United States Patent Office 2,957,620
Patented Oct. 25, 1960

2,957,620

COMPRESSOR HEAD ASSEMBLY

Wolfgang Turnwald, Milwaukee, Wis., assignor to Automatic Power, Inc., Houston, Tex., a corporation of Texas Filed Aug. 19, 1957, Ser. No. 679,004

2 Claims. (Cl. 230—231)

My invention relates to a compressor head assembly, and more particularly to a liquid-cooled cylinder head assembly with a two-way valve.

One purpose of the invention is to provide a cylinder head assembly that includes a minimum of parts and is simple to manufacture.

Another object is a compressor cylinder head assembly wherein the valve may be removed without disturbing the air discharge piping.

A further object is a compressor cylinder head assembly wherein the air valve may be removed for servicing or replacement without draining the cooling water.

A still further object is a novel sealing means arranged between the valve holder and the cylinder head whereby accurate machining of the metal-to-metal contact surfaces of the valve and the valve holder are eliminated.

Other objects will become apparent in the course of the specification and claims.

I illustrate my invention more or less diagrammatically in the accompanying drawings wherein:

Figure 2 is a top view of the cylinder head, disassembled, and partly in section;

Figure 3 is a section along line 3—3 of Figure 2;

Figure 4 is a bottom view of the valve holder, disassembled, and

Figure 5 is a section along line 5—5 of Figure 4.

Figure 1:
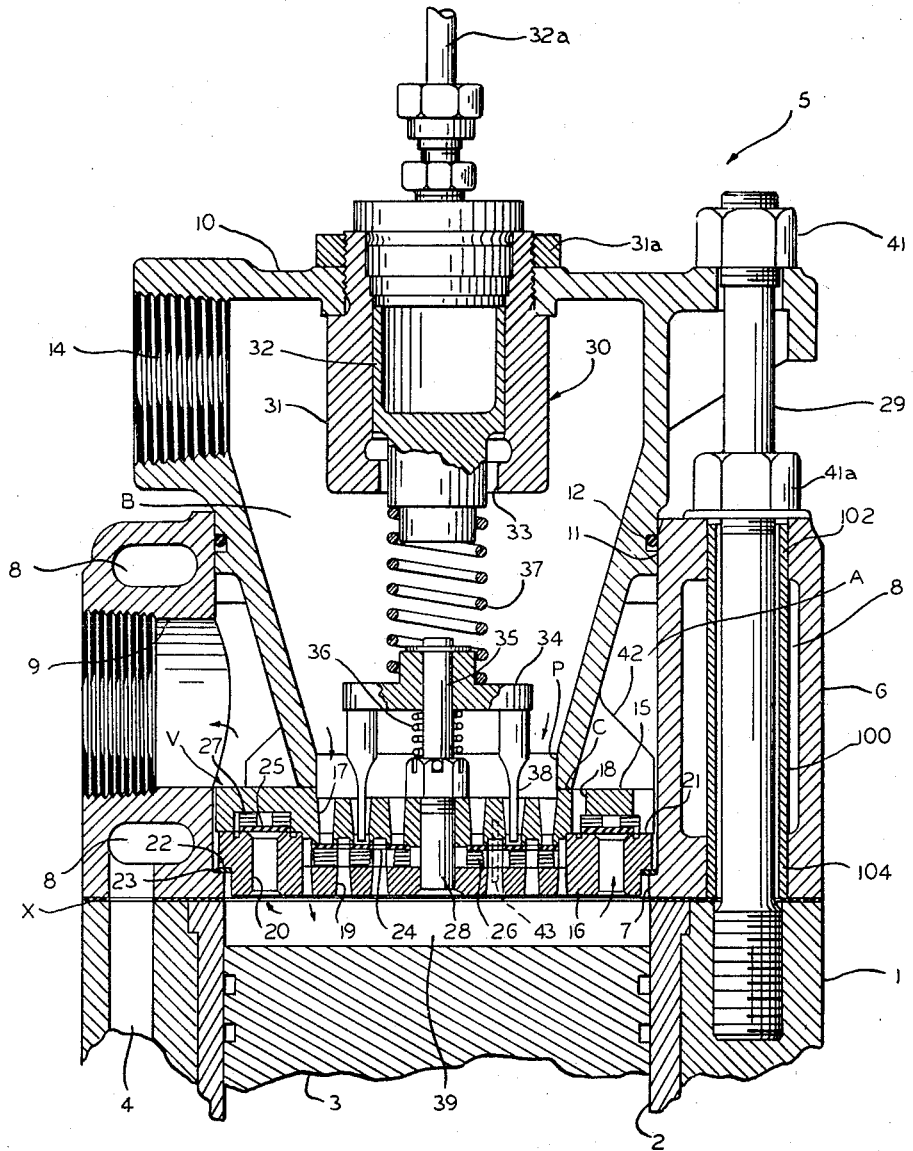
Figure 1 is an axial section of my improved cylinder head assembly.

Referring to Figure 1, 1 is a cylinder, 2 is a cylinder liner, 3 is a piston reciprocable in liner 2, and 4 is a cooling passage for water or any suitable coolant. 5 refers generally to my improved cylinder head assembly and includes a cylinder head 6 having a generally open central bore A, and a valve V and valve holder 10 in the bore. Cylinder head 6 may include an internal flange 7 in the bore, cooling passage 8 for a suitable cooling fluid and an internally threaded air discharge opening 9 adapted to communicate with any suitable air discharge piping (not shown). A gasket X may be provided between the cylinder head and cylinder. Cooling passage 8 in the cylinder head communicates with cooling passage 4 in the cylinder, and a suitable connection D for coolant may be provided.

The valve holder 10 is slidably received within the bore of cylinder head 6 by mating or sliding surfaces, as at 11. A suitable O-ring 12 provides an airtight seal between the mating surfaces 11 of the valve holder and cylinder head but does not in any way inhibit insertion or withdrawal of the valve holder. The O-ring may be made of silicon rubber or any suitable sealing material. 14 is a suitable air inlet passage communicating with a central chamber B in the valve holder, open at the bottom to the valve V, in the form of an air discharge passage P. Fins 42 integral with valve holder 10 bear upon valve V. It should be noted that the lower surface C of the valve holder and its fins 42 engage the top surface of the valve and effectively hold it in place.

Valve V may be circular and may include upper portion 15 and lower portion 16, and is shown as a conventional concentric type valve. Upper portion 15 is formed with inlet passages 17 and discharge passages 18, the latter passages communicating with the air discharge opening 9. Lower portion 16 is formed with inlet passages 19 and outlet passages 20. Upper portion 15 abuts lower portion 16 at 21 and the entire valve assembly rests on the internal flange 7 by means of shoulder 22 and a suitable seal 23. Valve assembly V may be a conventional two-way concentric valve. 24 is a central inlet valve disc adapted to cover inlet passages 17, and is suitably located by pin 43 carried by upper portion 15 and by centering pin 28. 25 is an annular outlet valve disc adapted to cover outlet passages 20. Suitable springs 26 and 27 acting in opposite directions hold discs 24 and 25 in abutting relation with suitable seats formed on the upper and lower portions 15 and 16, respectively. 28 is a centering pin received in upper and lower portions 15 and 16 for purposes to be described hereinafter.

29 is a securing means, in this instance a plurality of studs or the like extending through the valve holder 10, cylinder head 6 and into the cylinder 1 to independently hold valve holder 10 with nuts 41 or the like, air valve V, cylinder head 6, with nuts 41a or the like, and cylinder 1 in rigid relationship.

30 is an unloader assembly consisting of unloader cylinder 31 held in the valve holder by a nut 31a, unloader piston 32 slidably received in 31 and extending therethrough at 33. Mounted on a reduced upper end portion 35 of pin 28 is a plate member 34. A spring 36 supports the plate member 34 and holds it in the position shown in Figure 1. Extending between unloader cylinder 31 and plate member 34 is an unloader spring 37 which occupies the position shown during normal operation. To the bottom end of plate member 34 is attached a plurality of fingers 38 extending through inlet passages 17 and adapted to impinge upon disc 24 for a purpose to be described hereinafter.

Although an operative form of the device has been shown, the invention is not limited to the particular details shown. Many changes may be made in the form, shape and arrangement of parts without departing from the spirit of the invention.

The use, operation and function of the invention are as follows:

As piston 3 descends, springs 26 are compressed carrying with them the inlet valve disc 24 allowing atmospheric air to be drawn in through passages 14, 17 and 19 into cylinder compression space 39. On the upward stroke of the piston 3 the springs 26 seat disc 24 against upper member 15. At the same time springs 27 are compressed and annular outlet valve disc 25 is raised by internal pressure exerted by the ascending piston. Air from the compression space 39 flows through outlet passages 20, 18 and around the valve holder 10 through the discharge outlet 9.

When the pressure in space 39 increases to a predetermined point, say 60 p.s.i.g., conventional actuating mechanism such as a pressure gauge system (not shown) may admit air to unloader cylinder 31 through a suitable line 32a forcing piston 32 downwardly compressing spring 37 which in turn forces plate 34 and fingers 38 downwardly upon concentric disc 26, thus bleeding off excess pressure through inlet passages 19, 17 and 14. The unloader may be operated in response to the discharge pressure or to an automatic timer or otherwise.

It can be seen that to remove the air valve V for inspection, replacement or cleaning, it is only necessary to disconnect nut 41 from its stud and lift out valve holder 10 and air valve V. Similarly, discharge piping connected to discharge inlet 9 need not be disturbed, nor is there any necessity for draining the cooling water from the cooling passages 8 and 4.

It will also be seen that by the provision of the O-ring seal 12 accurate machining between the metal-to-metal contact surfaces C of the valve holder 10 and valve V are substantially eliminated. Although the valve V is of a conventional design and quite accurate, it is possible to have variance from individual valve to valve. Consequently, even if the bottom surfaces of the fins 42 and the upper portion of valve 15 were to be accurately machined, there is still a possibility for leakage of air.

The valve holder engages the valve at its lower end. The studs and nuts pull the valve holder down against the valve until the valve is fully seated on the shoulder 7. Metal to metal contact is therefore effected between the engaging surfaces C, and as a seal is necessary at this point, the surfaces must be accurately machined. At the same time the O-ring seal 12 effects a lateral or sliding seal between the cylindrical surfaces 11. Thus when the valve is fully seated, due to the downward thrust applied to the valve holder, the seals at C and 12 will be effective to prevent air leakage from the chamber or compartment A. At the same time the seal at the top, meaning at 12, is flexible or adjustable. This eliminates the requirement for accurate machining, which would be necessary if a metal-to-metal contact seal was required at the top of the chamber 12 between the valve holder and cylinder head. In other words, the axial dimensioning from the abutting surface C to the seal 12 is not critical and close tolerances are not required. Accordingly, an effective but inexpensive seal is provided and the valve holder and valve may be removed for repair or inspection without disconnecting the water and air lines to the cylinder head.

It should be noted that while the nuts and studs hold the cylinder head and valve holder, they are independently secured. The lower nuts 41a pull the cylinder head down against the cylinder and tightening thereof may be effected totally independently of proper seating and tightening of the valve holder, since it is held by the nuts 41. This has the advantage that either may be individually adjusted, but at the same time a limited number of parts are involved.

I have also shown a brass tube 100 surrounding each stud which may be expanded at the bottom and top as at 102 and 104, thereby sealing the stud passage through the coolant jacket or chamber, but any other suitable means might be used.

Certain component parts of my invention are conventional and the described preferred embodiment is for purpose of illustration only. For example, air valve V need not be a concentric valve but might be any suitable two-way check valve.

My device finds particular application on small diesel-compressor systems, such as the type used to operate fog horns.

I do not wish to be limited except by the scope of the following claims.

I claim:

1. A simple, easy to maintain air compressor assembly in which accurate machining between the metal-to-metal contact surfaces of the valve and valve holder members is eliminated, said assembly including, in combination, a cylinder and a piston reciprocable therein, a cylinder head member having a passage extending therethrough opening into communication with the cylinder, a high pressure outlet in the cylinder head member opening into communication with the passage, a valve positioned athwart the passage in contact with the cylinder head member, a valve holder member slidably received in the passage, said valve holder member having a low pressure inlet opening into communication with the valve and bearing against the valve in metal-to-metal contact, means for securing the valve holder member to the cylinder head member, said securing means including an elongated hold down member anchored in the cylinder and extending upwardly through the cylinder head member and an aligned portion of the valve holder member, and tightening means for positively drawing the valve holder member and cylinder head member downwardly against the cylinder, said air compressor further including sealing means between the vertical sliding surfaces of the valve holder member and cylinder head member which takes up the slack resulting from the metal-to-metal engagement of the valve to the valve holder member, said sealing means comprising a radial channel in one of the members and a compressible O-ring seal received therein extending outwardly into sealing engagement with the other member.

2. The combination of claim 1 further characterized in that the radial channel is formed in the valve holder member.

References Cited in the file of this patent

UNITED STATES PATENTS

| | | |
|---|---|---|
| 1,553,323 | Parks | Sept. 15, 1925 |
| 1,580,434 | Holdsworth | Apr. 13, 1926 |
| 1,611,678 | Redfield | Dec. 21, 1926 |
| 1,692,265 | Blom | Nov. 20, 1928 |
| 1,719,572 | Stoll | July 2, 1929 |
| 1,918,247 | Clapp | July 18, 1933 |
| 2,000,735 | Arnold | May 7, 1935 |
| 2,084,670 | Crittenden | June 22, 1937 |
| 2,525,619 | Roth et al. | Oct. 10, 1950 |

FOREIGN PATENTS

| | | |
|---|---|---|
| 27,046 | Great Britain | of 1913 |
| 234,640 | Switzerland | Feb. 1, 1945 |
| 497,437 | Italy | Sept. 14, 1954 |
| 809,841 | Germany | Aug. 2, 1951 |
| 812,820 | France | Feb. 8, 1937 |